US008672554B2

(12) United States Patent
Frydendal

(10) Patent No.: US 8,672,554 B2
(45) Date of Patent: Mar. 18, 2014

(54) BEARING, IN PARTICULAR FOR A WIND TURBINE

(75) Inventor: Niels Karl Frydendal, Brande (DK)

(73) Assignee: Siemens Aktiengesellschaft, Munich (DE)

(*) Notice: Subject to any disclaimer, the term of this patent is extended or adjusted under 35 U.S.C. 154(b) by 309 days.

(21) Appl. No.: 13/099,489

(22) Filed: May 3, 2011

(65) Prior Publication Data

US 2011/0274383 A1 Nov. 10, 2011

(30) Foreign Application Priority Data

May 6, 2010 (EP) .................................... 10162187

(51) Int. Cl.
*F16C 19/00* (2006.01)

(52) U.S. Cl.
USPC .......................................... 384/473; 384/462

(58) Field of Classification Search
USPC ......... 384/462, 465, 467, 471, 473, 474, 475, 384/606; 415/111, 112, 175, 229; 416/146 A, 174; 184/6.26, 7.4
See application file for complete search history.

(56) References Cited

U.S. PATENT DOCUMENTS

| 2,217,801 | A | * | 10/1940 | Morris | 384/475 |
| 3,161,448 | A | * | 12/1964 | Moran | 384/475 |
| 5,339,776 | A | * | 8/1994 | Regueiro | 123/196 CP |
| 5,749,660 | A | * | 5/1998 | Dusserre-Telmon et al. | 384/475 |
| 7,832,937 | B2 | * | 11/2010 | Suzuki | 384/462 |
| 7,883,271 | B2 | * | 2/2011 | Suzuki et al. | 384/462 |
| 8,403,110 | B2 | * | 3/2013 | Suzuki et al. | 184/6.26 |

FOREIGN PATENT DOCUMENTS

| CA | 2 669 050 A1 | 2/2010 |
| DE | 10 2006 052 835 A1 | 5/2008 |
| EP | 1 431 575 A2 | 6/2004 |
| EP | 2 136 093 A1 | 12/2009 |
| FR | 2 229 885 A1 | 12/1974 |
| GB | 1 033 245 A | 6/1966 |
| GB | 2 084 265 A | 4/1982 |
| WO | WO 03/078870 A1 | 9/2003 |
| WO | WO 2010/035011 A2 | 4/2010 |
| WO | WO 2010/040027 A2 | 4/2010 |

* cited by examiner

*Primary Examiner* — Richard W Ridley
*Assistant Examiner* — Adam D Rogers

(57) ABSTRACT

A bearing, in particular for a wind turbine, is provided. The bearing has a standing inner ring, an outer ring movable around the inner ring, lubricated rollers in a cage, arranged between the inner ring and the outer ring. The bearing includes a device for draining oil from a top region of the standing inner ring.

13 Claims, 5 Drawing Sheets

BEARING, IN PARTICULAR FOR A WIND TURBINE

CROSS REFERENCE TO RELATED APPLICATIONS

This application claims priority of European Patent Office Application No. 10162187.8 EP filed May 6, 2010, which is incorporated by reference herein in its entirety.

FIELD OF INVENTION

The present invention relates to a bearing, in particular for a wind turbine, comprising a standing inner ring, an outer ring, movable around the inner ring, and lubricated rollers contained in a cage, arranged between the inner ring and the outer ring.

BACKGROUND OF INVENTION

Bearings in wind turbines are usually lubricated with grease, however, such grease lubrication involves relatively short service intervals for replenishing the grease and after a certain amount of time the grease has to be exchanged.

From WO 03/078870 A1 a gear unit for a wind turbine is known comprising a planet gear where lubrication is effected by a stationary pump feeding oil through stationary oil lines. EP 1 431 575 A2 is another example for a planet gear where oil is supplied by channels which are connected to a pump.

Other bearings for wind turbines are known which are disposed in a gearbox with an oil sump and the bearing is lubricated during rotation.

All these bearings for wind turbines require a complicated lubrication system because it has to be ensured that all areas of the bearing receive sufficient oil. Due to the increasing size of such bearings, special attention has to be given to the top region of the bearing in order to supply the needed amount of oil for lubrication.

SUMMARY OF INVENTION

It is therefore an object of the present invention to provide a bearing, in particular for a wind turbine, with a simpler lubrication system.

According to the present invention this object is achieved in the above defined bearing in that the bearing comprises means for draining oil from the top region of the standing inner ring.

The present invention is based on the idea that by draining a small flow of oil out in the top of the bearing through the standing inner ring it can be monitored that there is enough oil in the top of the bearing. A sufficient amount of oil in the top region of the bearing indicates that even more oil is distributed in lower regions of the bearing.

According to the invention it is preferred that the means for draining oil is connected to a tank. This tank serves as a reservoir for oil form which oil is recirculated into the bearing.

According to a preferred embodiment of the invention the tank can be disposed in the lower part of the inner ring. Oil is drained in the top region of the bearing and supplied to the tank from where it is supplied again to lubricated parts of the bearing, namely tracks of inner and outer ring, rollers and cage.

Preferably the inventive bearing comprises a means for monitoring the flow of drained oil. The means for monitoring may trigger an alarm when the flow of drained oil is outside a predetermined interval.

According to a further development of the invention the means for monitoring the flow of drained oil may comprise an oil filter and preferably a pressure transducer for monitoring the pressure drop through the filter. When the pressure drop is monitored interruptions like a congested filter or a low amount of oil in the top region of the bearing can be detected.

According to the concept of the invention a lubrication is effected by passive oil circulation such that oil is distributed by the bearing rotation. When oil is distributed solely through rotation a separate oil pump is not needed, which leads to a substantial simplification of the wind turbine.

In order to obtain passive oil circulation the inventive bearing can comprise channels in the bottom of the standing inner ring allowing the oil to flow from the tank inside the bearing. It is advantageous that oil flows simply under the influence of gravity from the tank into the bearing where it is needed to lubricate moving components.

In order to improve the passive oil circulation the rotatable outer ring may comprise recesses or buckets suitable for carrying the lubrication means during rotation. The recesses or buckets are filled up with oil when they pass the bottom and oil is transported to the top region of the bearing.

According to the invention the recesses may be formed as inner bores ending at the inner side of the outer ring. The inner bores can accommodate a larger amount of oil so that the needed amount of oil can be supplied to the top region of the inventive bearing.

Preferably the inventive bearing can comprise a pump suitable for sucking oil form a separate compartment of the tank, into which oil from the top region of the bearing is fed, to the oil filter. A separate pump is merely needed for filtering the oil, whereas the lubrication of the rollers is effected only by the bearing rotation. The bearing may comprise a pipe connecting the oil filter and the top region of the bearing, so that filtered oil is supplied to the top region of the bearing.

The invention and its underlying principle will be better understood when consideration is given to the following detailed description of preferred embodiments.

DETAILED DESCRIPTION OF INVENTION

Figure 1:
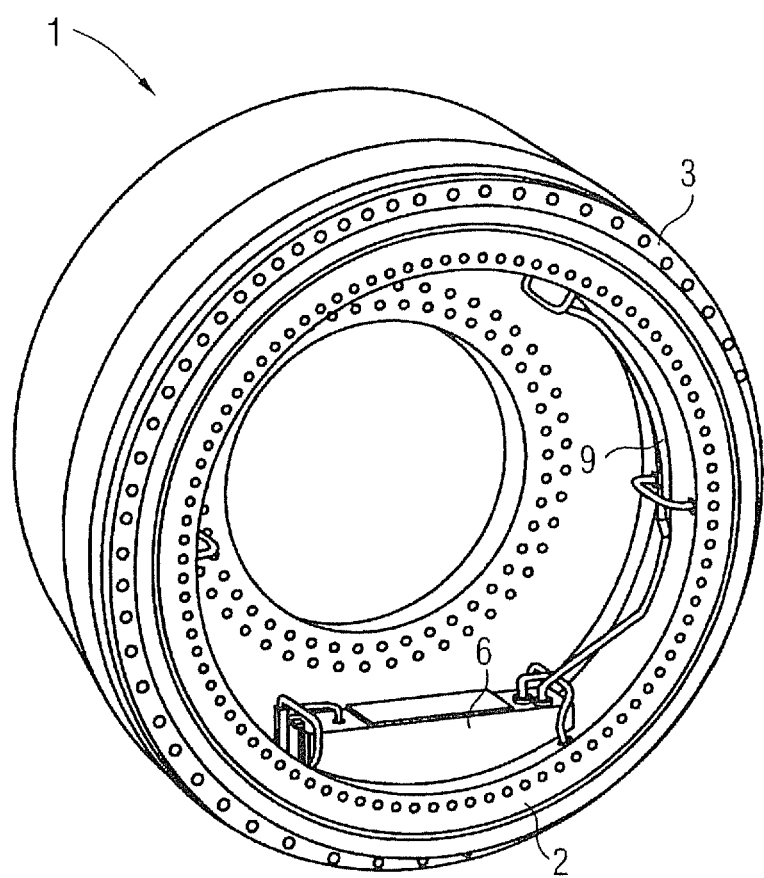
FIG. 1 shows a perspective view of an inventive bearing for a wind turbine.
Figure 2:
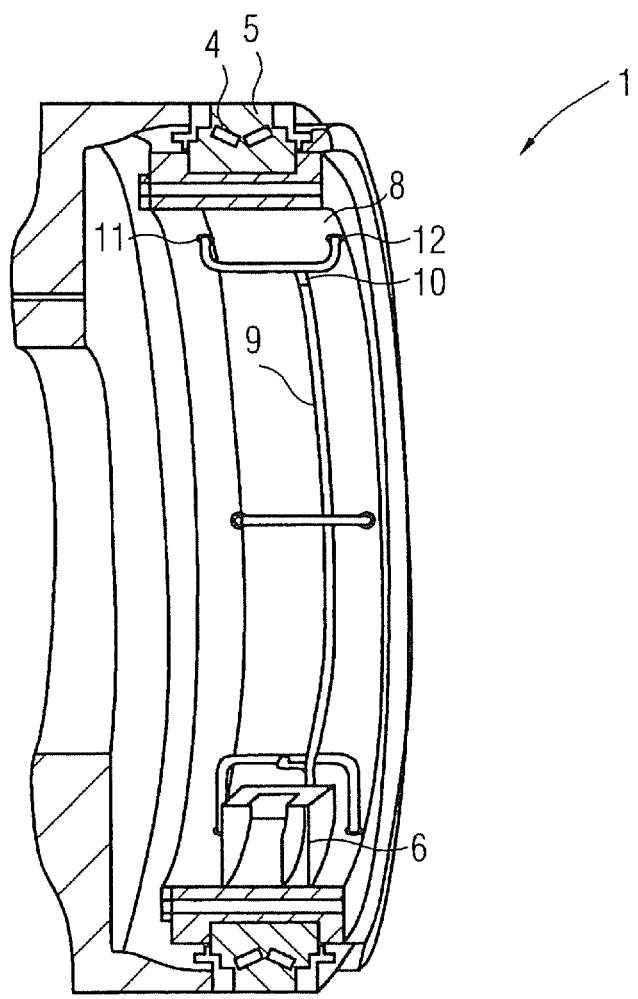
FIG. 2 is a sectional perspective view of the bearing of FIG. 1.

FIG. 1 shows a bearing 1 for a wind turbine in a perspective view, FIG. 2 shows the bearing 1 in a sectional view. The bearing 1 comprises a standing inner ring 2, an outer ring 3, rotatable around the inner ring 2 and lubricated rollers 4, contained in cage 5, as can be seen in FIG. 2.

Figure 3:
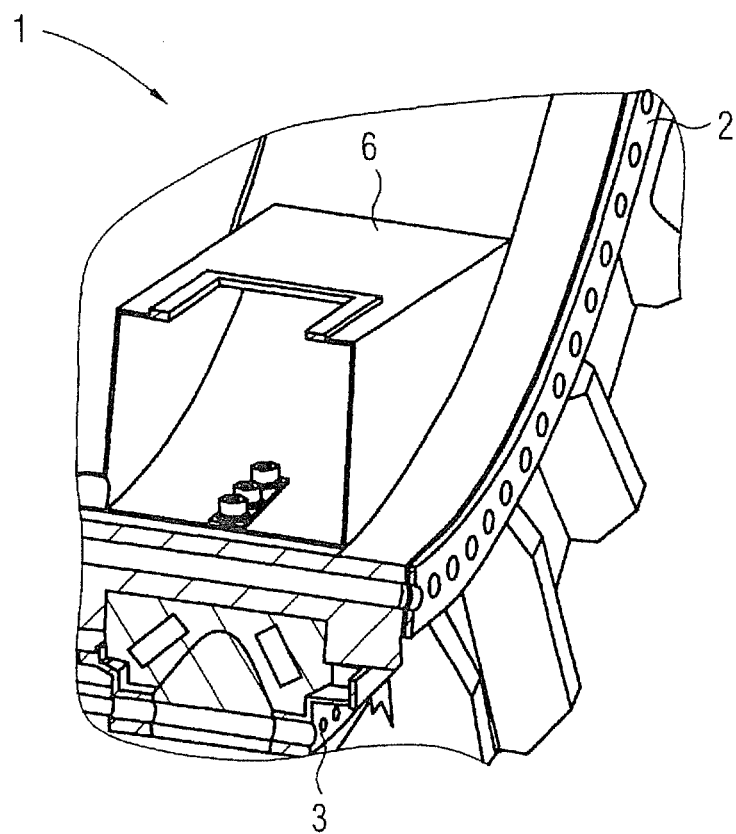
FIG. 3 is a sectional view of the lower part of the bearing of FIG. 1.

Lubrication of the rollers 4 is effected by passive oil circulation which means that the oil is distributed in the bearing 1 by the bearing rotation only. Referring now to FIG. 3, it can be seen that bearing 1 comprises a tank 6, disposed at the bottom of the standing inner ring 2. At the lower side of tank 6 an opening is provided so that oil from tank 6 can flow directly into the standing inner ring to rollers 4 and cage 5 so that lubrication is effected. Oil flows from the tank 6 to the outer ring 3 under the influence of gravity, therefore no separate pump for distributing oil is necessary.

Figure 4:
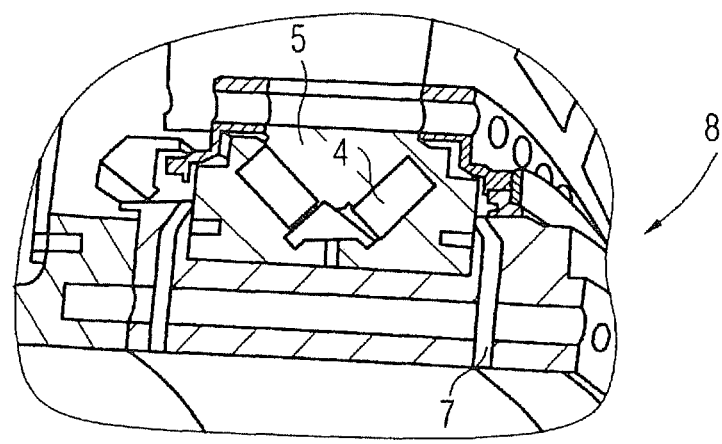
FIG. 4 is an enlarged sectional view of the top region of the bearing of FIG. 1.

As can be seen best in FIG. 2 a means for draining oil from the top region 8 is provided. This means comprises a pipe 9 connecting the top region 8 of the bearing 1 to the tank 6. FIG. 4 is an enlarged sectional view of the outer and the inner ring in the top region 8 of bearing 1. The pipe 9 comprises a branching 10 with two ends 11, 12, which are connected to channels 7 in the standing inner ring 2. During rotation of the wind turbine a small flow of oil is constantly drained from the top region 8 of the bearing 1. This oil is fed to the tank 6 and through an opening in the bottom of the tank 6. The oil flows through the inner ring 2 to rollers 4 and cage 5 of bearing 1. During rotation of bearing 1 oil is constantly conveyed from the lower region to the top region.

Figure 5:
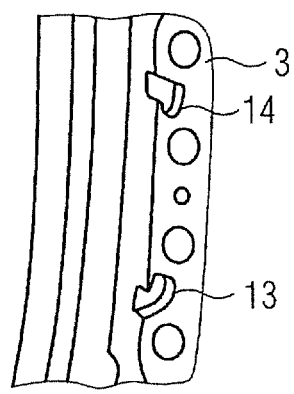
FIG. 5 shows a detail of the outer ring of the bearing.

FIG. 5 shows a detail of the outer ring 3 which comprises recesses 13, 14 which are provided in the rotatable outer ring 3 in order to ensure that oil is conveyed to the top region 8 of the bearing 1 when the wind turbine is turning slowly. The recesses 13, 14 are formed as "buckets" in the outer ring 3. These recesses 13, 14 are automatically filled up with oil when they pass the bottom under the tank 6. When the wind turbine is turning slowly most of the oil will be in the tank 6. When the outer ring 3 and the recesses 13, 14 elevate to the top region 8 of the bearing 1 the oil will gradually be drained out as the recesses 13, 14, which are formed as buckets, are turned upside down.

Figure 6:
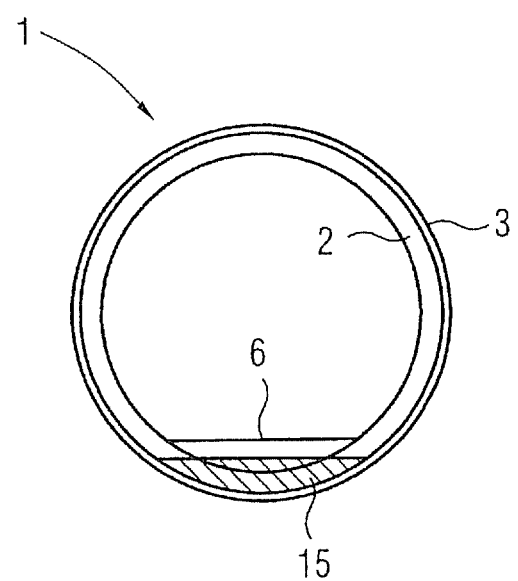
FIG. 6 a schematic diagram of the oil distribution at stand still.

FIG. 6 is a schematic diagram of the oil distribution at stand still. When the wind turbine is not turning the oil is collected in the bottom of bearing 1 and in the oil tank 6. The oil level 15 is indicated by the hatching.

Figure 7:
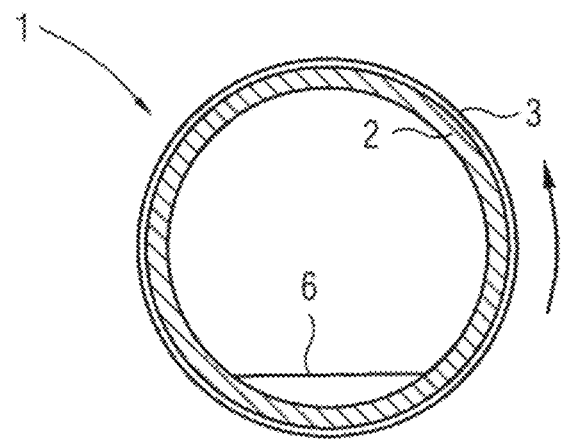
FIG. 7 a schematic diagram of the oil distribution when the bearing is turning.

FIG. 7 shows the oil distribution when the bearing is turning. In this state rollers, cage and the rotating outer ring 3 carry oil around so that oil from tank 6 flows down through the channels to the inside of bearing 1. With a limited amount of oil in the bearing 1 shortly all oil will be distributed all around in the bearing 1, as is indicated by the hatching. The oil will almost entirely be moved around by rollers 4 and cage 5 as long as the wind turbine turns.

Figure 8:
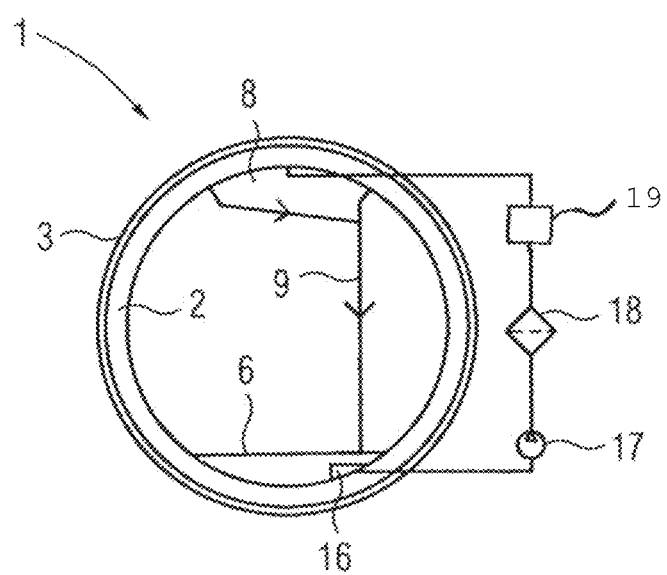
FIG. 8 is a schematic diagram of the inventive bearing.

FIG. 8 is a schematic diagram of the bearing 1 which shows that the tank 6 comprises a separate compartment 16 inside the tank 6 which is used as a pump sump. A pump 17 is connected to the compartment 16 and pumps the oil through a filter 18 from where the oil flows to the top region 8. Pump 17 and filter 18 are integrated in a single unit which further comprises one or more pressure transducers 19 and a temperature sensor. The combined unit is placed close to the bearing 1 inside the hollow shaft of the wind turbine, in other embodiments it may be placed in the back end of the nacelle.

When the wind turbine is stopped all oil will be in the bottom of bearing 1 and in oil tank 6 and compartment 16 and the quantity of the oil can be checked on the basis of the oil level.

When the wind turbine is rotating all oil will be spread around in the bearing 1 and there will be almost no oil in tank 6. In order to monitor that there is oil enough in the bearing 1 the flow in the drain from the top region 8 of bearing 1 is used as an indicator. As long as oil flows through filter 18, which is supplied from drain through pipe 9 and compartment 16 this indicates that there is oil in the top region 8 of bearing 1. To monitor this the pressure drop through filter 18 is monitored and as long as the pressure drop through filter 18 is in a certain interval this indicates that a sufficient amount of oil flows through filter 18. If the pressure drop is outside a predetermined interval an alarm is triggered and eventually the wind turbine is stopped in order to prevent damage due to insufficient lubrication. Compartment 16 comprises a level switch measuring the oil level so that the pump 17 is stopped when the oil level is too low. Consequently the pressure which is measured in filter 18 drops and after a certain delay the wind turbine is stopped.

The invention claimed is:

1. A bearing comprising:
a stationary inner ring;
an outer ring movable around the inner ring:
lubricated rollers contained in a cage, wherein the cage is arranged between the inner ring and the outer ring; and
a device for draining oil from a top region of the inner ring, wherein the device for draining oil is connected to a tank, wherein the tank is disposed in a bottom region of an inner circumferential surface of the inner ring,
a pump suitable for sucking oil from a separate compartment of the tank, into which the oil from the top region of the bearing is fed, to an oil filter.

2. The bearing according to claim 1, further comprising: a monitoring device for monitoring a flow of drained oil.

3. The bearing according to claim 2, wherein the monitoring device comprises the oil filter and a pressure transducer for monitoring a pressure drop through the oil filter.

4. The bearing according to claim 1, wherein lubrication is effected by passive oil circulation, whereby oil is distributed during rotation of the bearing.

5. The bearing according to claim 1, wherein the device for draining oil comprises channels provided in the inner ring allowing the oil to flow from the top region of the bearing into the tank.

6. The bearing according to claim 1, wherein the outer ring comprises recesses or buckets suitable for carrying oil during rotation.

7. The bearing according to claim 6, wherein the recesses or buckets are formed as inner bores ending at an inner side of the outer ring.

8. The bearing according to claim 1, further comprising: a pipe connecting the oil filter and the top region of the bearing.

9. A wind turbine, comprising:
a bearing, the bearing comprising:
a stationary inner ring;
an outer ring movable around the inner ring;
lubricated rollers contained in a cage, wherein the cage is arranged between the inner ring and the outer ring; and
a device for draining oil from a top region of the inner ring,
wherein the device for draining oil is connected to a tank,
wherein the tank is disposed in a bottom region of an inner circumferential surface of the inner ring,
a pump suitable for sucking oil from a separate compartment of the tank, into which the oil from the top region of the bearing is fed, to an oil filter; and a pipe connecting the oil filter and the top region of the bearing.

10. The wind turbine according to claim 9, wherein a monitoring device comprises the oil filter and a pressure transducer for monitoring a pressure drop through the oil filter.

11. The wind turbine according to claim 9, wherein lubrication is effected by passive oil circulation, whereby oil is distributed by a bearing rotation.

12. The wind turbine according to claim 9, wherein the device for draining oil comprises channels provided in the inner ring allowing the oil to flow from the top region of the bearing into the tank.

13. The wind turbine according to claim 9, wherein the outer ring comprises recesses or buckets suitable for carrying oil during rotation, wherein the recesses or buckets are formed as inner bores ending at an inner side of the outer ring.

* * * * *